(12) United States Patent
Champion

(10) Patent No.: US 9,022,399 B2
(45) Date of Patent: May 5, 2015

(54) VEHICLE CAB SUSPENSION DEVICE

(71) Applicant: Manitou BF, Ancenis (FR)

(72) Inventor: Philippe Champion, Montrelais (FR)

(73) Assignee: Manitou BF, Ancenis (FR)

( * ) Notice: Subject to any disclaimer, the term of this patent is extended or adjusted under 35 U.S.C. 154(b) by 0 days.

(21) Appl. No.: 13/891,590

(22) Filed: May 10, 2013

(65) Prior Publication Data

US 2013/0300081 A1 Nov. 14, 2013

(30) Foreign Application Priority Data

May 11, 2012 (FR) ...................................... 12 54306

(51) Int. Cl.
 *B60G 3/20* (2006.01)
 *B60G 11/64* (2006.01)
 *B62D 33/06* (2006.01)
(52) U.S. Cl.
 CPC ............ *B60G 11/64* (2013.01); *B62D 33/0608* (2013.01)
(58) Field of Classification Search
 CPC ............... B62D 33/06; B62D 33/0604; B62D 33/0608; B62D 33/067
 USPC .......... 280/124.104; 180/89.12, 89.13, 89.14; 296/190.01, 190.07
 See application file for complete search history.

(56) References Cited

U.S. PATENT DOCUMENTS

| | | | | |
|---|---|---|---|---|
| 3,618,692 A * | 11/1971 | Stikeleather | ............... | 180/89.14 |
| 3,797,883 A * | 3/1974 | Steiner et al. | ............. | 180/89.14 |
| 3,944,017 A * | 3/1976 | Foster | ........................ | 180/89.15 |
| 3,948,341 A * | 4/1976 | Foster | ......................... | 180/89.15 |
| 3,966,009 A * | 6/1976 | Meacock et al. | ............ | 180/89.15 |
| 4,473,238 A * | 9/1984 | Antoine | ................. | 280/124.101 |
| 5,209,316 A * | 5/1993 | Bauer | ......................... | 180/89.14 |
| 5,299,651 A * | 4/1994 | Wilson | ........................ | 180/89.12 |
| 5,368,118 A * | 11/1994 | Hoefle | ........................ | 180/89.12 |
| 5,398,774 A * | 3/1995 | Nilsson et al. | ............. | 180/89.14 |
| 5,553,911 A * | 9/1996 | Bodin et al. | ............. | 296/190.07 |
| 5,890,557 A * | 4/1999 | Glass et al. | ................. | 180/89.13 |
| 6,206,121 B1 * | 3/2001 | Michel | ........................ | 180/89.13 |
| 6,439,651 B1 * | 8/2002 | Johansson et al. | ......... | 180/89.13 |
| 2006/0148340 A1 * | 7/2006 | Gibbs | ........................ | 440/12.52 |

FOREIGN PATENT DOCUMENTS

| | | | |
|---|---|---|---|
| FR | 2067459 A | * | 2/1989 |
| FR | 2749265 | | 12/1997 |
| FR | 2 822 791 | | 10/2002 |
| WO | 97/46439 | | 12/1997 |
| WO | 2008/051138 | | 5/2008 |
| WO | 2008/051139 | | 5/2008 |
| WO | WO 2012014229 A1 | * | 2/2012 |

OTHER PUBLICATIONS

French Search Report dated Feb. 13, 2013, corresponding to the French Priority Application No. 12 54306.

* cited by examiner

*Primary Examiner* — Paul N Dickson
*Assistant Examiner* — Robert A Coker
(74) *Attorney, Agent, or Firm* — Young & Thompson

(57) ABSTRACT

A device for suspending the cab of a vehicle includes a U-shaped main torsion bar (5) and a main actuator (3). The U-shaped main torsion bar (5) is positioned more or less along the longitudinal axis of the vehicle.

8 Claims, 3 Drawing Sheets

VEHICLE CAB SUSPENSION DEVICE

FIELD OF THE INVENTION

The invention is of particular use in suspending cabs of all-terrain vehicles, which are subjected to high-amplitude shocks.

One particular application of the invention is the suspension of cabs of all-terrain materials-handling vehicles, particularly the cabs of handling vehicles with telescopic arm.

BACKGROUND OF THE INVENTION

In the known way, the cab suspension of telescopic-arm handling vehicles comprises three or four mounting points fitted with rubber mounts. These rubber mounts provide limited filtration of vibrations in the low frequencies, in high-magnitude shocks with an amplitude of the order to one decimeter.

Another suspension system used on agricultural tractors or all-terrain machines involves linear-travel spring-damper assemblies which have a degree of freedom in the direction of vertical translation. Such a suspension system does, however, entail stabilizing the other degrees of freedom through the use of link rods or parallelograms. However, the independence of the mounting points and the weight distribution allow disruptive coupling between the bouncing, pitching and rolling movements of the cab.

In order to avoid these undesirable movements, stabilizing torsion bars that limit the coupling may be provided. It is also possible to provide active systems comprising actuators and sensors driven by the on-board computer system of the machine comprising the cab.

Document FR 2 749 265 describes a main suspension with just one single U-shaped torsion bar to limit the connections between the chassis and the suspended bodyshell. The bar is secured by fixings at its base and by two rotational articulations at the respective ends of its arms. The reduction of noise bridges between the chassis and the driving cab of the vehicle means that the cab can be very well soundproofed at low cost. The use of the U-shaped torsion bar which constitutes one sole main suspension member thus means that the cost of suspending the cab can be reduced. However, in order to avoid pitching movements a U-shaped secondary torsion bar is provided, interposed between the cab and the chassis. This U-shaped secondary torsion bar is positioned in such a way that its base runs parallel to the axis of the vehicle and its arms run transversely to the said axis.

SUMMARY OF THE INVENTION

It is a first object of the invention to improve on the prior art that is known, notably from document FR 2 749 265, by proposing a suspension device that is compact, easy to manufacture and has a reduced number of moving parts.

It is a second object of the invention to avoid coupling between the bouncing, pitching and rolling movements.

One subject of the invention is a device for the suspension of a vehicle cab comprising a U-shaped main torsion bar and a main actuator, characterized in that the U-shaped main torsion bar is positioned more or less along the longitudinal axis of the vehicle, to keep the cab in a stable position and reduce the pitching thereof.

According to other alternative features of the invention:
- the ends of the U-shaped torsion bar may be fixed to the front and to the rear of the cab, or the ends of the U-shaped torsion bar may be fixed to the chassis of the vehicle;
- the main actuator is advantageously positioned at the rear of the cab;
- the main actuator is preferably chosen from the group including: a conventional assembly comprising coil spring and telescopic hydraulic damper, a passive pneumatic or oleopneumatic system, an active hydropneumatic system coupled to an electronic computer, a magnetor rheological variable-damping system, and an elastomer spring;
- at least one end of the U-shaped torsion bar may be connected to the cab via a damper means;
- the damper means may be an elastomer damper means;
- the damper means may be an inertia damper;
- the damper means may be a telescopic hydraulic damper;
- the device may comprise a mechanism controlling the relative displacement of the top and bottom points of a deformable quadrilateral formed by the points of articulation of an arm and of the U-shaped torsion bar.

BRIEF DESCRIPTION OF THE DRAWINGS

The invention will be better understood through the description which will follow, which is given by way of nonlimiting example with reference to the attached drawings in which.

DETAILED DESCRIPTION OF THE INVENTION

Figure 1:
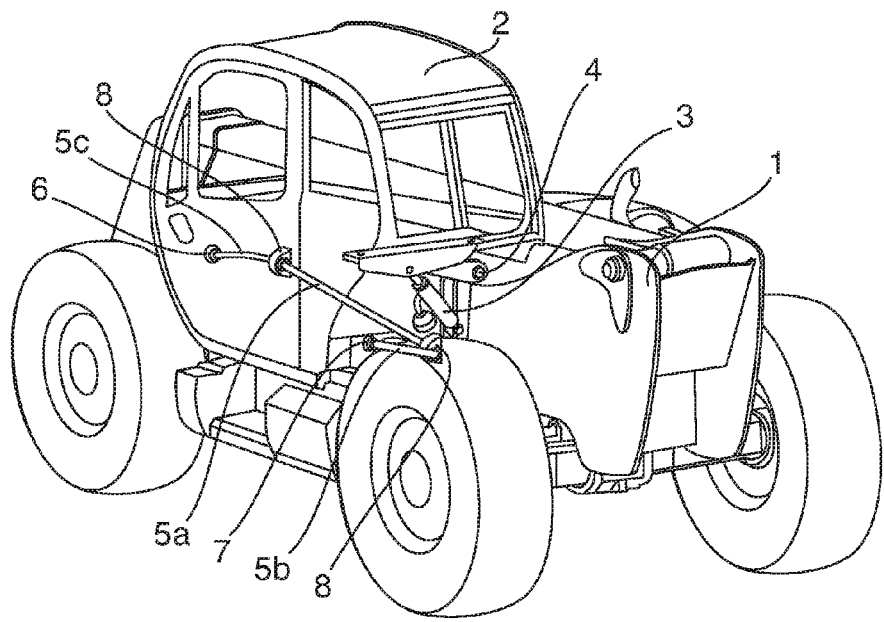
FIG. 1 schematically depicts a perspective view of a cab suspension device incorporated into an all-terrain vehicle.

With reference to FIGS. 1 to 5, elements that are identical or functionally equivalent are identified by identical reference numerals.

In FIG. 1, an all-terrain handling vehicle, for example a handling vehicle with telescopic arm, comprises a self-propelled chassis (1) and a cab (2) that is suspended with respect to the self-propelled chassis (1).

The chassis (1) comprises a reinforcement (1a) and the cab (2) comprises a mount (2a).

A damping member (3), for example an oleopneumatic member (3), and a suspension arm (4) are mounted between the self-propelled chassis (1) and the cab (2) that is suspended with respect to the self-propelled chassis (1).

Advantageously, the oleopneumatic cylinder (3) is mounted on two pivot pins (3a, 3b), whereas the arm (4) is mounted on one pivot pin (4a) and the aforementioned pivot pin (3b) which is common to the oleopneumatic cylinder (3).

The pivot pin (4a) and the pivot pin (3a) are secured to the chassis (1) while the pivot pin (3b) is secured to the cab (2).

A U-shaped main torsion bar (5) having a base (5a) and two lateral arms (5b, 5c) is mounted between the cab (2) and the chassis (1).

The U-shaped main torsion bar (5) is articulated at its ends to two pivot pins (6 and 7) of the cab and by its central part (5a) on bearings (8) of the chassis (1).

The points of articulation (3b, 4a, 7 and 8) define a deformable quadrilateral of which two points (4a and 8) are located on the chassis (1) and two more points (3b and 7) are located on the cab (2).

The suspension member (3) essentially vertically filters shocks and vibrations as the all-terrain handling vehicle moves around.

The triangle formed by the vertices (3a, 3b and 4a) deforms, thereby filtering the vibrations and movements of the cab (2) in pitch and roll.

The cab (2) is kept in a stable position by the U-shaped torsion bar (5) comprising the elements (5a, 5b, 5c).

The articulation (6) is positioned more or less above the plane defined by the elements (5a, 5b) of the U-shaped torsion bar.

The U-shaped torsion bar (5) thus includes an element (5c) which is bent upward, so that the point (6) of articulation to the cab is notably higher up than the point (7) of articulation situated at the rear of the cab.

By providing a U-shaped torsion bar (5) that is very stiff, the vertical and transverse loadings are fully absorbed by the elastic damping member (3).

Reactions are transmitted between the front and the rear of the cab (2) by the torsion bar (5) interacting with the front (6) and rear (7) articulations.

The stiffness of the U-shaped torsion bar (5) allows reactions to be transferred between the front and the rear of the cab (2) in order to damp the pitching of the cab (2).

Figure 2:
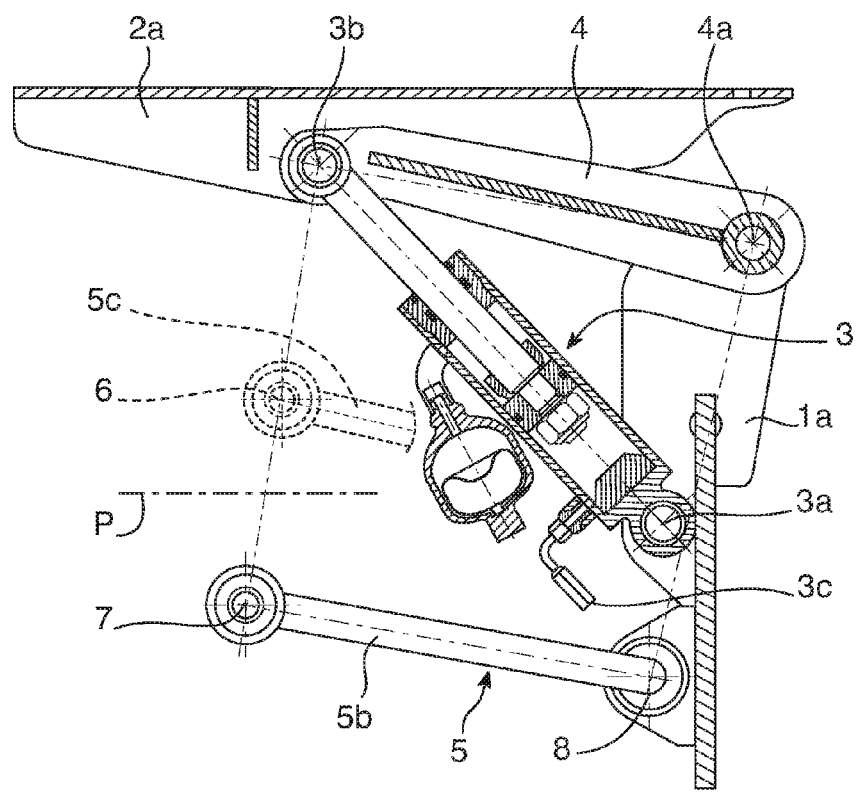
FIG. 2 schematically depicts a rear view of a suspension device of FIG. 1 according to the invention.

The suspension device according to the invention is depicted in the neutral position in FIG. 2.

The suspension device according to the invention comprises the mount (2a) secured to the cab (2), the reinforcement (1a) secured to the chassis (1), the damping member (3), and the U-shaped torsion bar (5) articulated to the pivot pins (6 and 7) at its two ends.

The damping member (3) in this example comprises an outlet (3c) for height adjustment, should the operator of the all-terrain handling vehicle wish to alter the attitude or height of the cab (2) for the job in hand.

The pivot pins (6 and 7) are secured to the cab (2) in this embodiment.

The suspension device inclined with respect to the vertical direction of loading means that a horizontal loading due, for example, to braking, or a combined horizontal and vertical loading due, for example, to passage over rough terrain, can be partially damped.

The arms (5b and 5c) may differ in length in order to introduce a particular dynamic response in stiffness and in damping depending on the positioning of the articulation point (6).

Figure 5:
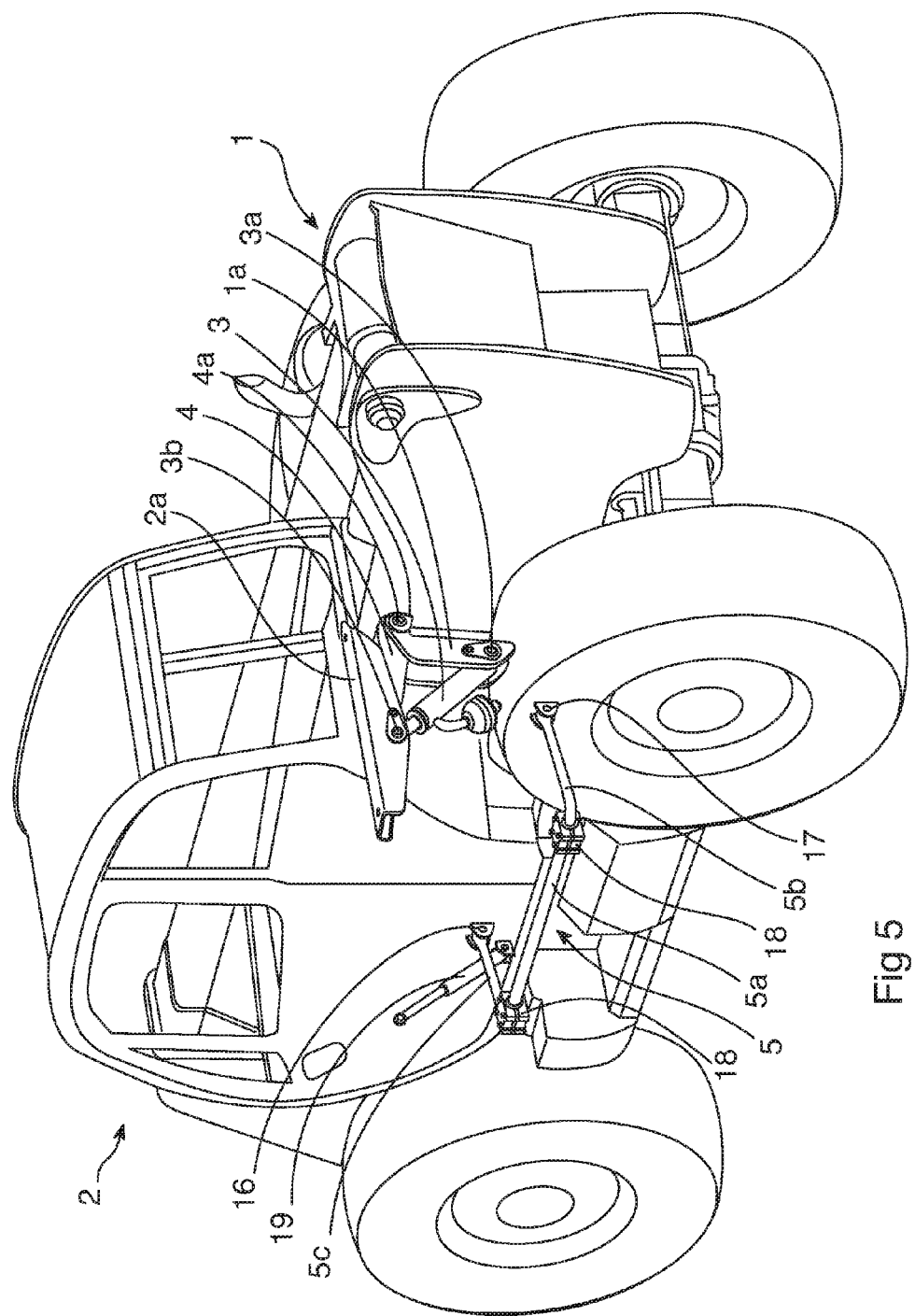
FIG. 5 schematically depicts a perspective view of a third cab suspension device incorporated into an all-terrain vehicle.

An auxiliary damping member (19) as depicted in FIG. 5 may also be mounted between the cab (2) and the chassis (1), at the front of the cab (2) in order to make up for the lack of intrinsic damping of the torsion bar and of its rubber bearings.

Figure 3:
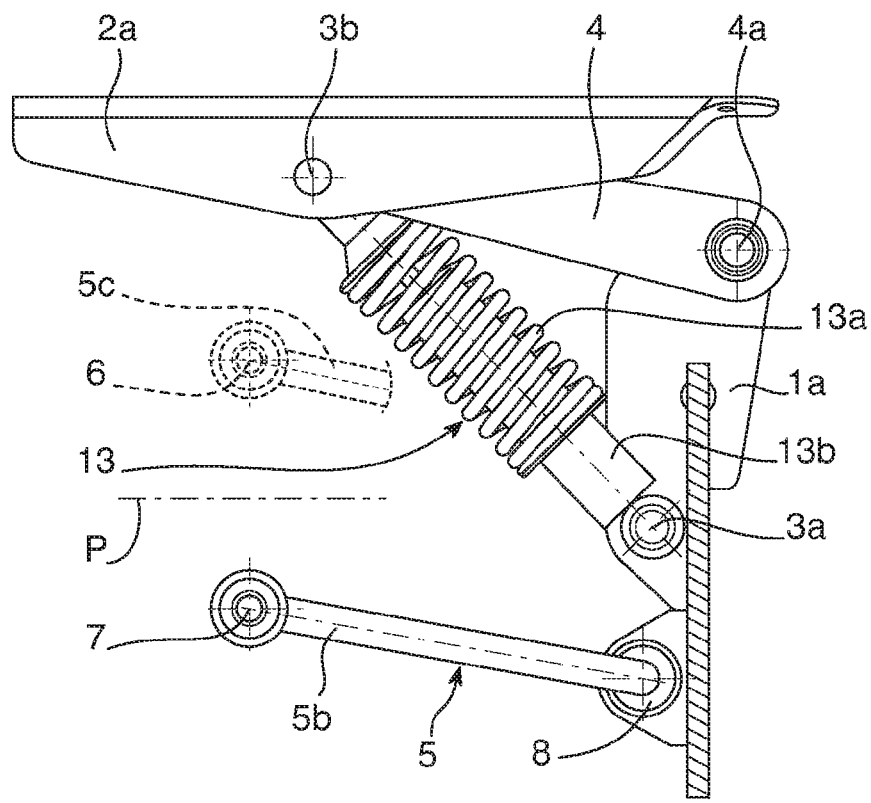
FIG. 3 schematically depicts a rear view of another device according to the invention.

In FIG. 3, another device according to the invention comprises an arm (4) that is articulated between the chassis (1) and the cab (2), a U-shaped torsion bar (5) mounted via its ends (6 and 7) to the cab (2) and articulated on the bearings (8) of the chassis (1), and a damping element (13).

The damping element (13) comprises a coil spring (13a) and a telescopic hydraulic damper (13b).

The points (3b, 4a, 8 and 7) of articulation define a deformable quadrilateral the deformation of which is damped by the damping element (13).

The damping element (13) comprising the coil spring (13a) and the telescopic hydraulic damper (13b) may be replaced by any equivalent system without departing from the scope of the present invention.

Thus, any elastic or damping element may be mounted in place of the member (3) or of the damping element (13), for example: a passive pneumatic system with no height adjustment, a passive oleopneumatic system with no height adjustment, an active hydropneumatic system coupled to an electronic computer, a magnetor rheological variable damping system or a simple elastomer spring.

The choice of main elastic damping element is made by the person skilled in the art according to the desired level of performance sought for the suspension device.

In the example depicted, the points (6 and 7) of articulation of the ends of the U-shaped torsion bar (5) are positioned on either side of the cab (2), it being possible for this arrangement to be modified without departing from the scope of the invention.

Where there is a desire to incorporate a system having greater flexibility in roll, or even where there is a desire to impose a pendular motion, the two articulation points (6 and 7) are sited in the corresponding positions.

In order to ensure the stability of the cab (2), at least one of the articulation points (6 or 7) is preferably positioned above the plane (P) containing the centre of gravity of the cab.

Figure 4:
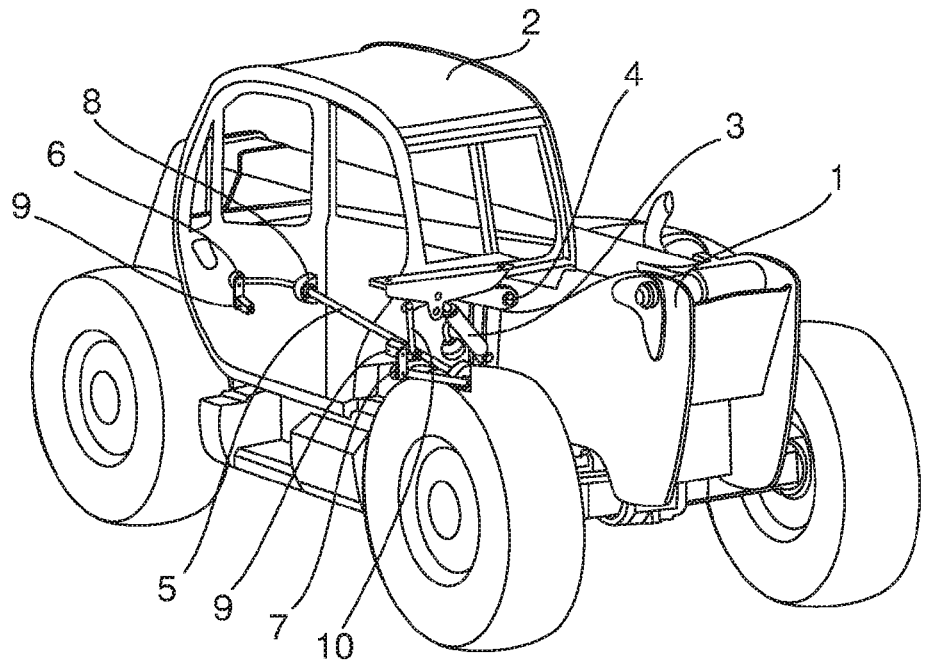
FIG. 4 schematically depicts a perspective view of a piece of an all-terrain handling vehicle equipped with a second cab suspension device according to the invention.

In FIG. 4, another embodiment of the all-terrain handling vehicle according to the invention comprises a suspension device having a U-shaped torsion bar (5) and a deformable quadrilateral defined by the articulation points (4a, 3b, 7 and 6), and a damping element or member (3).

The ends (7 and 8) of the U-shaped torsion bar (5) are not fixed rigidly to the cab (2) but are connected via an additional damping device (9) to a fixed point of the cab (2).

The presence of the elastic elements (9) ensures greater lateral flexibility. Where it is desired to impose a pendular motion, while at the same time limiting the rolling motion of the cab (2), provision may be made for a link rod mechanism (10) to be fitted to control the relative displacement of the top (3b) and bottom (7) points of the deformable quadrilateral (3b, 4a, 8 and 7).

The mechanism (10) thus allows control over the motion when the suspension device according to the invention is in operation.

In FIG. 5, another embodiment of the all-terrain handling vehicle according to the invention comprises a suspension device having a U-shaped torsion bar (5), a deformable quadrilateral defined by articulation points (4a, 3b, 17 and 18), and a damping element or member (3).

The chassis (1) comprises a reinforcement (1a) and the cab (2) comprises a mount (2a).

An oleopneumatic damping member (3) and a suspension arm (4) are mounted between the self-propelled chassis (1) and the cab (2) that is suspended with respect to the self-propelled chassis (1).

Advantageously, the oleopneumatic cylinder (3) is mounted on two pivot pins (3a, 3b), whereas the arm (4) is mounted on one pivot pin (4a) and the aforementioned pivot pin (3b) that is common to the oleopneumatic cylinder (3).

The pivot pin (4a) and the pivot pin (3a) are secured to the chassis (1), whereas the pivot pin (3b) is secured to the cab (2).

A U-shaped main torsion bar (5) comprising a base (5a) and two lateral arms (5b, 5c) is mounted between the cab (2) and the chassis (1).

The U-shaped main torsion bar (5) is articulated by its central part (5a) to bearings (18) of the cab (2) and at its ends to two pivot pins (16 and 17) of the chassis (1).

The articulation points (3b, 4a, 17 and 18) define a deformable quadrilateral of which two points (4a and 17) are located on the chassis (1) and two other points (3b and 18) are located on the cab (2).

The suspension member (3) essentially vertically filters shocks and vibrations as the all-terrain handling vehicle moves around.

The triangle formed by the vertices (3a, 3b and 4a) deforms, thereby filtering vibrations and movements of the cab (2) in pitch and roll.

The cab (2) is kept in a stable position by the U-shaped torsion bar (5) comprising the elements (5a, 5b, 5c).

The articulation (16) is positioned more or less level with the plane defined by the elements (5a, 5b) of the U-shaped torsion bar.

The U-shaped torsion bar (5) comprises an element (5c) substantially parallel to the element (5b), so that the point (16) of articulation to the cab is more or less level with the articulation point (17) situated at the rear of the cab.

By providing a U-shaped torsion bar (5) that is very stiff, vertical and transverse loadings are fully absorbed by the elastic damping member (3).

The differences in reaction are transmitted between the front and the rear of the cab (2) by the torsion bar (5) interacting with the front (16) and rear (17) articulations.

The stiffness of the U-shaped torsion bar (5) allows the reactions to be transferred between the front and the rear in order to damp the pitching of the cab (2).

The damping member (3) in this example comprises an outlet (3c) for a height adjustment, should the operator of the all-terrain handling vehicle wish to alter the attitude or height of the cab (2) for the job in hand.

The pivot pins (16 and 17) are secured to the chassis (1) in this embodiment.

An auxiliary damping member (19) may also be mounted between the cab (2) and the chassis (1), at the front of the cab (2), in order to make up for the lack of intrinsic damping of the torsion bar and of its rubber bearings.

The invention described with reference to a number of embodiments is not in any way restricted to those embodiments but rather covers any modification in form and any variant embodiment that falls within the scope of the attached claims.

The invention claimed is:

1. A device for the suspension of a vehicle cab (2) comprising:
  a U-shaped main torsion bar (5) positioned more or less along a longitudinal axis of a vehicle to keep the vehicle cab (2) in a stable position and fully absorb static pitching reaction thereof;
  a main actuator (3, 13); and
  a mechanism (10) controlling relative displacement of top (3b) and bottom (7) points of a deformable quadrilateral (3b, 4a, 8, 7) formed by points of articulation of an arm (4) and of the U-shaped torsion bar (5).

2. A device for the suspension of a vehicle cab (2) comprising:
  a U-shaped main torsion bar (5) positioned more or less along a longitudinal axis of a vehicle, to keep the vehicle cab (2) in a stable position and fully absorb static pitching reaction thereof;
  a main actuator (3, 13) positioned at a rear of the vehicle cab (2); and
  a dynamic secondary damper means (19) positioned at a front of the vehicle cab (2),
  wherein the device further comprises a mechanism (10) controlling relative displacement of top (3b) and bottom (7) points of a deformable quadrilateral (3b, 4a, 8, 7) formed by points of articulation of an arm (4) and of the U-shaped torsion bar (5).

3. A device for the suspension of a vehicle cab (2) comprising:
  a chassis (1) with a reinforcement (1a);
  a mount (2a) attached to the vehicle cab (2);
  a damping member (3) and a suspension arm (4) mounted at a common point (3b) on the mount (2a) and respectively at two different points (4a, 3a) on the chassis (1), the damping member (3) and suspension arm being positioned at a rear of the vehicle cab (2); and
  a U-shaped main torsion bar (5) having two lateral arms (5b, 5c) mounted, at two points (6, 7) to the vehicle cab (2) and a base (5a) mounted, via a further point (8) to the chassis (1), the U-shaped main torsion bar (5) positioned along a longitudinal axis of a vehicle to keep the vehicle cab (2) in a stable position and fully absorb static pitching reaction thereof,
  wherein the damping member (3) vertically filters shocks and vibrations, and
  wherein vertices of the common point (3b) on the mount (2a) and the two different points (4a, 3a) on the chassis (1) define a deformable triangle that filters vibrations and movements of the vehicle cab (2) in pitch and roll.

4. The device of claim 3, further comprising:
  a dynamic damper member (19) mounted between the vehicle cab (2) and the chassis (1), at the front of the vehicle cab (2).

5. The device of claim 3, wherein,
  the common point (3b) on the mount (2a) is a common pivot point (3b),
  the two different points (4a, 3a) on the chassis (1) are different pivot points (4a, 3a) on the chassis (1),
  the two points (6, 7) to the vehicle cab are two pivot points (6, 7) to the vehicle cab,
  the further point (8) to the chassis (1) is a further pivot point (8) to the chassis (1), and
  the common pivot point (3b) on the mount (2a), the two different pivot points (4a, 3a) on the chassis (1), the two pivot points (6, 7) to the vehicle cab (2), and the further pivot (8) to the chassis (1) are points of articulation (3b, 4a, 7, 8) defining a deformable quadrilateral of which two points (4a, 8) are located on the chassis (1) and two more points (3b, 7) are located on the vehicle cab (2).

6. The device of claim 5, further comprising:
  a mechanism (10) controlling relative displacement of the common pivot point (3b) and one of the two more points (3b) located on the vehicle cab (2) and defining top (3b) and bottom (7) points of the deformable quadrilateral (3b, 4a, 8 and 7).

7. The device of claim 3, wherein,
  the common point (3b) on the mount (2a) is a common pivot point (3b),
  the two different points (4a, 3a) on the chassis (1) are different pivot points (4a, 36a) on the chassis (1),
  the two points (6, 7) to the vehicle cab are two pivot points (6, 7) to the vehicle cab, the further point (8) to the chassis (1) is a further pivot point (8) to the chassis (1), and
  the common pivot point (3b) on the mount (2a), the two different pivot points (4a, 3a) on the chassis (1), the two pivot points (6, 7) to the vehicle cab (2), and the further pivot (8) to the chassis (1) are points of articulation (3*b*, 4*a*, 7, 8) defining a deformable quadrilateral of which two points (4*a*, 8) are located on the chassis (1) and two more points (3*b*, 7) are located on the vehicle cab (2).

8. The device of claim 7, further comprising:
a mechanism (10) controlling relative displacement of the common pivot point (3*b*) and defining top (3*b*) and bottom (7) points of the deformable quadrilateral (3*b*, 4*a*, 8 and 7).

* * * * *